United States Patent
Hakami et al.

(10) Patent No.: US 9,659,027 B2
(45) Date of Patent: May 23, 2017

(54) RECURRING CALENDAR ITEM MASTER AND INSTANCE SYNCHRONIZATION

(71) Applicant: Microsoft Technology Licensing, LLC, Redmond, WA (US)

(72) Inventors: Sina Hakami, Bothell, WA (US); Juan V. Esteve Balducci, Sammamish, WA (US); Patrick Tousignant, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/994,639

(22) Filed: Jan. 13, 2016

(65) Prior Publication Data

US 2016/0124988 A1 May 5, 2016

Related U.S. Application Data

(63) Continuation of application No. 13/706,333, filed on Dec. 5, 2012, now Pat. No. 9,268,833.

(51) Int. Cl.
*G06F 17/30* (2006.01)
*G06Q 10/10* (2012.01)
*G06F 3/0484* (2013.01)

(52) U.S. Cl.
CPC ...... *G06F 17/30174* (2013.01); *G06F 3/0484* (2013.01); *G06F 17/30575* (2013.01); *G06F 17/30589* (2013.01); *G06Q 10/109* (2013.01)

(58) Field of Classification Search
CPC .................................. G06F 17/30575
USPC .................................. 707/618, 634
See application file for complete search history.

(56) References Cited

U.S. PATENT DOCUMENTS

| 8,037,021 B2 | 10/2011 | Adler et al. |
| 8,112,537 B2 | 2/2012 | Guenther et al. |
| 8,126,922 B2 * | 2/2012 | Holzapfel ............ G06Q 10/109 707/781 |

(Continued)

OTHER PUBLICATIONS

"Calendar in Cafe Bazaar for Android", Retrieved from <<https://web.archive.org/web/20121026065637/http://cafebazaar.ir/app/com.google.android.calendar/?l=en>>, Retrieved on: Oct. 29, 2023, 2 Pages.

(Continued)

*Primary Examiner* — Joshua Bullock
(74) *Attorney, Agent, or Firm* — Goff Patent Law, PLLC; Jared S. Goff

(57) ABSTRACT

A synchronization window for synchronizing data for a calendar in a client calendar data store on a calendar data client computer system with data for the calendar in a server calendar data store on a calendar data server computer system can be calculated using a current time. A request for synchronization data for calendar items for the calendar with calendar times that are within the synchronization window can be sent to the calendar data server. One or more responses to the request can be received from the calendar data server. The response(s) can include received records for calendar items that are at least partially within the synchronization window. The received records can include a master record of a recurring calendar item and an instance record of an occurrence of the recurring calendar item. The received records for the calendar items can be incorporated in the client calendar data store.

20 Claims, 6 Drawing Sheets

(56) References Cited

U.S. PATENT DOCUMENTS

| | | | |
|---|---|---|---|
| 2008/0046471 A1* | 2/2008 | Moore | G06Q 10/109 |
| 2008/0306963 A1* | 12/2008 | Adler | G06Q 10/109 |
| 2009/0228606 A1* | 9/2009 | McCarthy | H04L 67/1097 |
| | | | 709/248 |
| 2011/0161454 A1 | 6/2011 | Da Fonseca Mendes et al. | |

OTHER PUBLICATIONS

"Google Calendar API", Retrieved from <<https://web.archive.org/web/20120803074224/https://developers.google.com/google-apps/calendar/>>, Retrieved on: Sep. 9, 2012, 1 Page.

"Goosync: All the Goosync Features", Retrieved from <<http://www.goosync.com/Features.aspx>>, May 31, 2009, 4 Pages.

"How to Keep Your Family in Sync with Hotmail Calendar", Retrieved from <<https://web.archive.org/web/20100819175850/http://www.microsoft.com/athome/organization/familysync.aspx>>, Retrieved on: Aug. 19, 2010, 4 Pages.

"Synchronizing with SmarterMail", Retrieved from <<http://help.smartertools.com/SmarterMail/v8/Default.aspx?qq=%2fsmartermail%2fv8%2ftopics%2fuser%2fsynchronization%2fsynchsmartermail.aspx>>, Retrieved on Sep. 19, 2012, 18 Pages.

"Final Office Action Issued in U.S. Appl. No. 13/706,333", Mailed Date: Aug. 26, 2015, 13 Pages.

"Non-Final Office Action Issued in U.S. Appl. No. 13/706,333", Mailed Date: Mar. 4, 2015, 11 Pages.

"Notice of Allowance Issued in U.S. Appl. No. 13/706,333", Mailed Date: Oct. 23, 2015, 8 Pages.

* cited by examiner

RECURRING CALENDAR ITEM MASTER AND INSTANCE SYNCHRONIZATION

RELATED APPLICATIONS

The present application is a continuation of U.S. application Ser. No. 13/706,333, filed Dec. 5, 2012, and entitled RECURRING CALENDAR ITEM MASTER AND INSTANCE SYNCHRONIZATION, which is incorporated herein by reference. If any disclosures are incorporated herein by reference and such incorporated disclosures conflict in part or whole with the present disclosure, then to the extent of conflict, and/or broader disclosure, and/or broader definition of terms, the present disclosure controls. If such incorporated disclosures conflict in part or whole with one another, then to the extent of conflict, the later-dated disclosure controls.

BACKGROUND

Calendar data is often maintained in a server calendar data store on a calendar data server computer system. A client computer system may also maintain a client version of the calendar data in a client calendar data store. The client version may be version of the entire calendar data from the server or the client version may be a subset of the calendar data from the server. Such systems can allow the calendar data on the client to be synchronized with the calendar data on the server. To do this, the calendar data can be sent from the server to the client. The synchronization data may include data for a recurring calendar item. For example, the data may include a master record for the recurring item.

SUMMARY

The tools and techniques herein relate to synchronization of calendar data, such as calendar data for a recurring calendar item. As used herein, synchronization refers to retrieving data from a server and integrating the retrieved data into pre-existing data in a client data store to bring the client data store into synchronization with at least a portion of a server data store. For example, a synchronization operation may be performed where the client data store already has data, but additional data is to be added to the client data store or the existing data on the client data store has become outdated so that it no longer matches data in the server data store. A synchronization operation refers to one operation to bring the client data store into synchronization with the server data store, although such a synchronization operation may involve downloading multiple discrete portions or chunks of the synchronization data. The synchronization may be performed automatically, and it may be performed on a repeated basis, such as at set time intervals and/or when data on the server has changed. The synchronization data sent from a calendar data server to a calendar data client in a synchronization operation can include a master record for a recurring calendar item as well as one or more instance records for one or more occurrences of the recurring calendar item. As used herein, a master record of a recurring calendar item is a data structure that represents the overall recurring calendar item, and an instance record is a data structure that represents an occurrence of the recurring calendar item.

In one embodiment, the tools and techniques can include automatically calculating a synchronization window for synchronizing data for a calendar in a pre-existing client calendar data store on a calendar data client computer system with data for the calendar in a server calendar data store on a calendar data server computer system. The calculation of the synchronization window can use a current time. A request for synchronization data for calendar items for the calendar with calendar times (such as a specific time or range of times for a calendar meeting item) that are at least partially within the synchronization window can be sent to the calendar data server. One or more responses to the request can be received from the calendar data server. The response(s) can include received records for calendar items that are at least partially within the synchronization window. The received records can include a master record of a recurring calendar item and an instance record of an occurrence of the recurring calendar item. The received records for the calendar items can be incorporated in the client calendar data store. A calendar view with one or more representations of the calendar items can be displayed on an output device of the client computer system.

In another embodiment of the tools and techniques, data for a calendar can be maintained by a calendar data server computer system in a server calendar data store. The calendar data server can send synchronization data for the calendar from the calendar data store to a calendar data client computer system in a synchronization operation. The synchronization data can include a master record of a recurring calendar item and at least one instance record of an occurrence of the recurring calendar item.

This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

DETAILED DESCRIPTION

Figure 1:
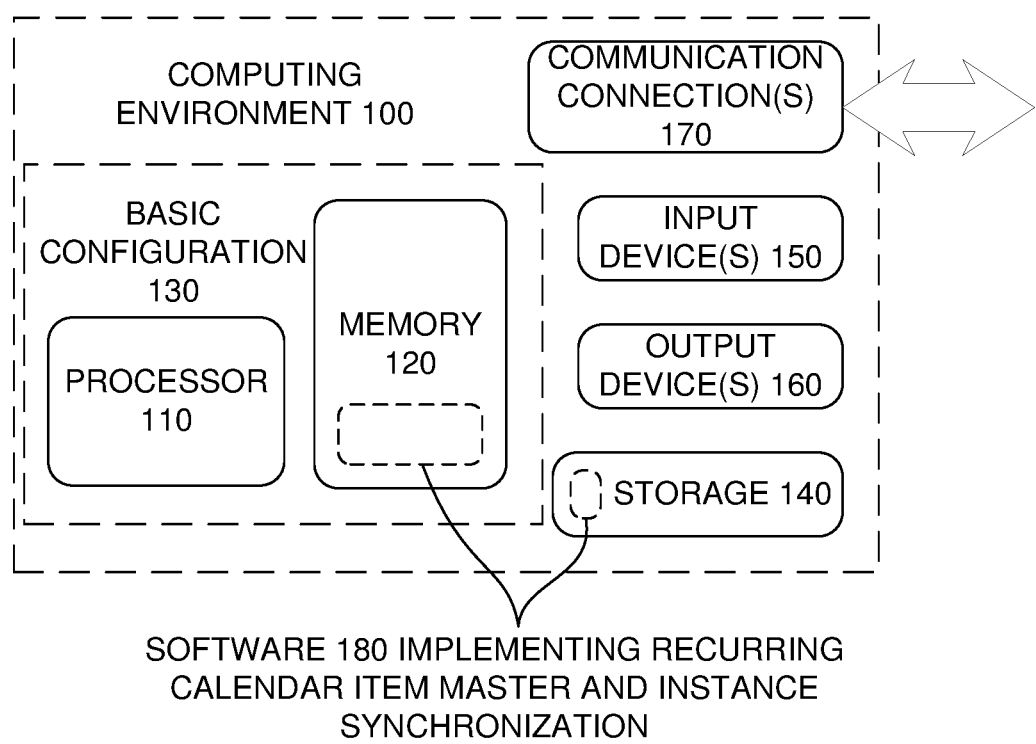
FIG. 1 is a block diagram of a suitable computing environment in which one or more of the described embodiments may be implemented.

Embodiments described herein are directed to techniques and tools for improved synchronization of a client calendar data store with a server calendar data store. Such improvements may result from the use of various techniques and tools separately or in combination.

Such techniques and tools may include a synchronization operation that includes downloading synchronization calendar data in a ready-to-use manner. For example, this may include downloading both master records and instance records for recurring calendar items. This can reduce complex calculations that can be involved in expansion of recurring calendar items on the client. The synchronization can happen at pre-defined times, such as when calendar data is changed on the server (e.g., through notification received from the server) or when a scheduled time is reached. The synchronization operation may reduce the amount of data downloaded to the client, such as by excluding from the synchronization data that has already been downloaded to the client in previous synchronization operations. For example, the data to be included in the synchronization may be identified based on what has changed in the server data store since the last synchronization time. Additionally, the client may specify limits for the size of synchronization data sent in a particular response. Accordingly, data for a synchronization operation may be sent in chunks of data that are within this limit. The limit may be a "soft" limit, where the server can send more than the limit in a single response in some situations. For example, the server may override the limit if a master record and the instance record(s) for a recurring calendar item will exceed the limit, or if a record for a single non-recurring calendar item will exceed the limit.

The synchronization operation may be an incremental synchronization for a synchronization window of calendar time. This window may be calculated based on a current time, such as a current time on the client or a current time on the server. This synchronization window can be a floating window that moves forward as the current time moves forward.

Accordingly, one or more substantial benefits can be realized from the tools and techniques described herein. For example, by sending both the master record and instance record(s) for a recurring calendar item in the synchronization data, the records can be directly consumed on the client, without the client performing techniques to expand master records that may be sent without sending instance records. This can simplify processing on the client, which may simplify the development and maintenance of client applications. However, the master record can still be available to aid the client in performing operations related to the entire recurring calendar item (allowing user input to edit the recurring calendar item pattern, etc.) even if the client is off-line and not connected to the server at the time of such operations.

The subject matter defined in the appended claims is not necessarily limited to the benefits described herein. A particular implementation of the invention may provide all, some, or none of the benefits described herein. Although operations for the various techniques are described herein in a particular, sequential order for the sake of presentation, it should be understood that this manner of description encompasses rearrangements in the order of operations, unless a particular ordering is required. For example, operations described sequentially may in some cases be rearranged or performed concurrently. Moreover, for the sake of simplicity, flowcharts may not show the various ways in which particular techniques can be used in conjunction with other techniques.

Techniques described herein may be used with one or more of the systems described herein and/or with one or more other systems. For example, the various procedures described herein may be implemented with hardware or software, or a combination of both. For example, dedicated hardware logic components can be constructed to implement at least a portion of one or more of the techniques described herein. For example and without limitation, such hardware logic components may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc. Applications that may include the apparatus and systems of various embodiments can broadly include a variety of electronic and computer systems. Techniques may be implemented using two or more specific interconnected hardware modules or devices with related control and data signals that can be communicated between and through the modules, or as portions of an application-specific integrated circuit. Additionally, the techniques described herein may be implemented by software programs executable by a computer system. As an example, implementations can include distributed processing, component/object distributed processing, and parallel processing. Moreover, virtual computer system processing can be constructed to implement one or more of the techniques or functionality, as described herein.

I. Exemplary Computing Environment

FIG. 1 illustrates a generalized example of a suitable computing environment (100) in which one or more of the described embodiments may be implemented. For example, one or more such computing environments can be used as a computing system such as a calendar data server or a calendar data client. Generally, various different general purpose or special purpose computing system configurations can be used. Examples of well-known computing system configurations that may be suitable for use with the tools and techniques described herein include, but are not limited to, server farms and server clusters, personal computers, server computers, smart phones, laptop devices, slate devices, game consoles, multiprocessor systems, microprocessor-based systems, programmable consumer electronics, network PCs, minicomputers, mainframe computers, distributed computing environments that include any of the above systems or devices, and the like.

The computing environment (100) is not intended to suggest any limitation as to scope of use or functionality of the invention, as the present invention may be implemented in diverse general-purpose or special-purpose computing environments.

With reference to FIG. 1, the computing environment (100) includes at least one processing unit or processor (110) and memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be volatile memory (e.g., registers, cache, RAM), non-volatile memory (e.g., ROM, EEPROM, flash memory), or some combination of the two. The memory (120) stores software (180) implementing recurring calendar item master and instance synchronization. An implementation of recurring calendar item master and instance synchronization may involve all or part of the activities of the processor (110) and memory (120) being embodied in hardware logic as an alternative to or in addition to the software (180).

Although the various blocks of FIG. 1 are shown with lines for the sake of clarity, in reality, delineating various components is not so clear and, metaphorically, the lines of FIG. 1 and the other figures discussed below would more accurately be grey and blurred. For example, one may consider a presentation component such as a display device to be an I/O component (e.g., if the display device includes a touch screen). Also, processors have memory. The inventors hereof recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computer," "computing environment," or "computing device."

A computing environment (100) may have additional features. In FIG. 1, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The storage (140) may be removable or non-removable, and may include computer-readable storage media such as flash drives, magnetic disks, magnetic tapes or cassettes, CD-ROMs, CD-RWs, DVDs, or any other medium which can be used to store information and which can be accessed within the computing environment (100). The storage (140) stores instructions for the software (180).

The input device(s) (150) may be one or more of various different input devices. For example, the input device(s) (150) may include a user device such as a mouse, keyboard, trackball, etc. The input device(s) (150) may implement one or more natural user interface techniques, such as speech recognition, touch and stylus recognition, recognition of gestures in contact with the input device(s) (150) and adjacent to the input device(s) (150), recognition of air gestures, head and eye tracking, voice and speech recognition, sensing user brain activity (e.g., using EEG and related methods), and machine intelligence (e.g., using machine intelligence to understand user intentions and goals). As other examples, the input device(s) (150) may include a scanning device; a network adapter; a CD/DVD reader; or another device that provides input to the computing environment (100). The output device(s) (160) may be a display, printer, speaker, CD/DVD-writer, network adapter, or another device that provides output from the computing environment (100). The input device(s) (150) and output device(s) (160) may be incorporated in a single system or device, such as a touch screen or a virtual reality system.

The communication connection(s) (170) enable communication over a communication medium to another computing entity. Additionally, functionality of the components of the computing environment (100) may be implemented in a single computing machine or in multiple computing machines that are able to communicate over communication connections. Thus, the computing environment (100) may operate in a networked environment using logical connections to one or more remote computing devices, such as a handheld computing device, a personal computer, a server, a router, a network PC, a peer device or another common network node. The communication medium conveys information such as data or computer-executable instructions or requests in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The tools and techniques can be described in the general context of computer-readable media, which may be storage media or communication media. Computer-readable storage media are any available storage media that can be accessed within a computing environment, but the term computer-readable storage media does not refer to propagated signals per se. By way of example, and not limitation, with the computing environment (100), computer-readable storage media include memory (120), storage (140), and combinations of the above.

The tools and techniques can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment. In a distributed computing environment, program modules may be located in both local and remote computer storage media.

For the sake of presentation, the detailed description uses terms like "maintain," "determine," "calculate," "send," "incorporate," "display," and "receive" to describe computer operations in a computing environment. These and other similar terms are high-level abstractions for operations performed by a computer, and should not be confused with acts performed by a human being, unless performance of an act by a human being (such as a "user") is explicitly noted. The actual computer operations corresponding to these terms vary depending on the implementation.

II. Calendar Synchronization System and Environment

Figure 2:
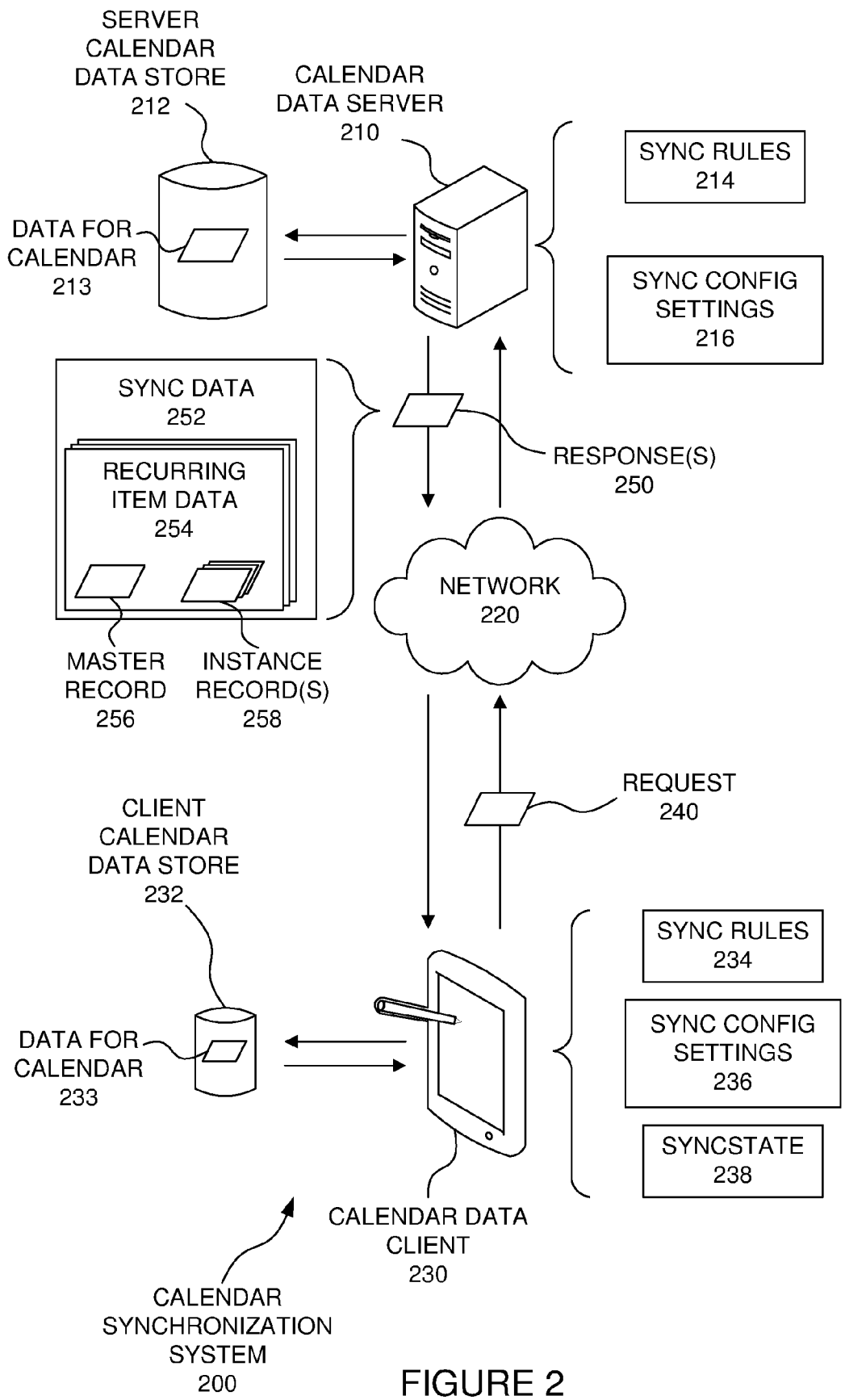
FIG. 2 is a schematic diagram of a calendar synchronization environment or system.

FIG. 2 is a schematic diagram of a calendar synchronization environment or system (200) in conjunction with which one or more of the described embodiments may be implemented. The system (200) can include a calendar data server computer system (210), which can maintain a server calendar data store (212) (which may be included in the calendar data server (210) and/or external to the calendar data server (210)). The calendar data server (210) may also act as a server for other information, such as email information, etc. The server calendar data store (212) can include data (213) for a calendar, and may include data for multiple calendars. For example, the data (213) for the calendar may include data for non-recurring calendar items, such as single meetings or other calendar events. The data (213) for the calendar may also include data for recurring calendar items. The calendar data server (210) may also store and access synchronization rules (214) and synchronization configuration settings (216), which can govern behavior of the calendar data server (210) in participating in synchronization operations. The calendar data server (210) can be connected to a computer network (220). For example, the network (220) may include a wired and/or wireless local area network, wide area network, and/or global computer network.

A calendar data client (230) may also be connected to the computer network (220) so that the calendar data client (230) can communicate with the calendar data server (210). The calendar data client (230) can maintain a client calendar data store (232), which can include data (233) for the calendar. The data (233) for the calendar in the client calendar data store (232) can be synchronized with the data (213) for the calendar in the server calendar data store (212). The calendar data client (230) can store and access synchronization rules (234) and synchronization configuration settings (236), which can govern the behavior of the calendar data client (230) during synchronization operations. The calendar data client (230) may also include an output device such as a display for displaying the calendar, and one or more user input devices, such as the types of user input devices discussed above with reference to FIG. 1.

The calendar data client (230) may also store and access a synchronization state data structure (238). The synchronization state data structure (238) can include one or more indications of a current state of the synchronization of the data (233) for the calendar in the client calendar data store (232) with the data (213) for the calendar in the server calendar data store (212). For example, the synchronization state data structure (238) may include identifiers of records for calendar items that have been synchronized, and also indications of which versions of those records have been synchronized with the data (233) for the calendar in the client calendar data store (232). Alternatively, the synchronization state data structure (238) may be stored and maintained by the calendar data server (210).

During a synchronization operation, the calendar data client (230) can send a request (240) for synchronization data, which may be a single message or a series of messages. The request (240) can include the synchronization state data structure (238), or the synchronization state data structure (238) may be sent to the calendar data server (210) separately. In response to the request (240), the calendar data server (210) access the data (213) for the calendar, and can use that data (213) to prepare and send one or more responses (250) according to the synchronization rules (214). The response(s) (250) can include synchronization data (252), which can include data for calendar items in the calendar. For example, the synchronization data (252) can include data (254) for a recurring calendar item. The data (254) for the recurring calendar item can include a master record (256) and/or one or more instance records (258). The calendar data client (230) can receive the synchronization data (252) and incorporate the synchronization data (252) into the data (233) for the calendar in the client calendar data store (232) according to the synchronization rules (234) on the calendar data client (230). The calendar data client (230) can also use the updated data (233) for the calendar to display a view of the calendar and possibly receive user input to revise the calendar. The calendar data client (230) can inform the calendar data server (210) of such changes, such as by sending appropriate calendar records reflecting such revisions to the calendar. In response, the calendar data server (210) can make corresponding changes to the data (213) for the calendar in the server calendar data store (212).

III. Synchronization Example with Floating Synchronization Window

An example of synchronization operations will now be discussed. Periodically, or upon receiving a notification from the server, which indicates a change in calendar data, the calendar data client (230) can craft a request (240) and submit the request (240) to the calendar data server (210). This request (240) can contain information such as a synchronization state data structure (238), an identifier of the calendar of interest, the start time of the synchronization window, and the end time of the synchronization window. However, the request (240) may not include such information and may take any of various different forms. For example, if synchronization state data structure (238) were maintained on the calendar data server (210), the request (240) may be a simple message establishing communication with the calendar data server (210) and/or indicating availability of the calendar data client (230). Thus, the request (240) may be present in a primarily push-based system. The synchronization window is the window of time, whose data is synchronized to the client.

The synchronization window can be larger than a view of the calendar to be displayed at the calendar data client (230). For example, even if the calendar data client (230) will only display a view of the current month, the synchronization window may include an entire year from the current date (e.g., a year into the future and/or a year into the past). Also, in addition to such a main time window, the synchronization time window may include a supplemental window, such as an additional time window to include time that would be included in a typical view that would include the last day of the main time window. For example, if the current day were Feb. 12, 2013, and the main time window were one year before and after this date, then the supplemental time window could be extended to include the window beginning one week prior to February 2012 (i.e., back to Jan. 25, 2012) and the window could be extended to include one week after February 2014 (i.e., forward to Mar. 7, 2014). Such an extended supplemental window could allow the full month at the end of the main window to be displayed (with a few additional days to complete a typical month view that often includes one or more days from the preceding and following month), and could allow the full month at the beginning of the main window to be displayed (again, with a few additional days to complete a typical month view that often includes one or more days from the preceding and following month). The length of such main and supplemental time windows relative to the current time can be specified in the synchronization configuration settings (216 and/or 236) and the time windows may be adjusted based on conditions such as user input, available resources on the calendar data client (230), and/or current network conditions.

The synchronization window can be dynamically calculated on the calendar data client (230), based on the synchronization configuration settings (236), and also based on the current point in time (e.g., according to a clock on the calendar data client (230)). Alternatively, the synchronization window may be dynamically calculated on the server, based on the synchronization configuration settings (216), and also based on the current point in time. The synchronization configuration settings (236 and 216) may be revised in response to user input received at the calendar data server (210) and/or the calendar data client (230). As noted above, the synchronization state data structure (238) can include information that can be used by the calendar data server (210) to determine changes that have happened since the last successful synchronization operation, and the time span that is added to the synchronization window since the last successful synchronization operation (in case the synchronization window is sliding forward). Additionally, if the last synchronization operation was terminated prematurely (e.g., due to a size limit), the synchronization state data structure (238) can indicate where to resume the synchronization.

The calendar data server (210) can use this synchronization state data structure (238) and follow the synchronization rules (214) to craft one or more responses (250), which can include information about the calendar within the synchronization time window. The calendar data server (210) can send the response(s) (250) to the calendar data client (230). The response(s) (250) can include synchronization data (252) including information indicating which items are to be removed from the client calendar data store (232) (e.g., by indicating calendar item identifiers for the records of items to be removed), and records for items to be added or updated in the client calendar data store (232). The response(s) (250) can also include an updated synchronization state data structure (238), which can be used in the next request (240) by the calendar data client (230). Each response of the one or more responses (250) can also include data indicating whether there is still more synchronization data (252) to download, or whether the calendar data client (230) will be fully up-to-date after processing this response.

The calendar data server (210) may send only the minimum required data for each item in the synchronization window to the client in the synchronization response(s) (250). The client may ask for additional required data outside the synchronization window to serve a user interface at the calendar data client (230) in one or more additional batches. For example, if the calendar data client (230) receives user input requesting a calendar view outside the synchronization window and the calendar data client (230) is connected to the calendar data server (210), then the client may request from the calendar data server (210) additional data for that requested calendar view. The calendar data client (230) may then process that data to surface the requested calendar view in a user interface.

IV. Synchronization Rules

The calendar data server (210) can follow the synchronization rules (214) in determining what data (213) for the calendar to send in the response(s) (250) to the calendar data client (230). The calendar data server (210) can use the synchronization rules (214) to allow the calendar data server (210) to avoid re-sending data (213) for the calendar that has been previously sent to the calendar data client (230) in previous synchronizations (although data may be re-sent in some situations). In determining what data (213) for the calendar has already been sent to the calendar data client, the calendar data server (210) can inspect the synchronization state data structure (238), which may be sent from the calendar data client (230). An example of some synchronization rules (214) will now be discussed. However, different rules may be used in different types of systems and in different configurations. Also, some of the synchronization rules may be included in the synchronization rules (234) at the calendar data client (230) or elsewhere.

The synchronization rules (214) may dictate that delete notifications may be sent all calendar items (e.g., meetings) that are currently on the calendar data client (230), but have been deleted from the data (213) for the calendar in the server calendar data store (212). Such notifications may include identifiers for the deleted items. For example, a collection of deleted item identifiers may be sent in the synchronization data (252). Delete notifications can be sent without including the record for the calendar items to be deleted.

Additionally, notifications can be sent for single instance calendar items that are currently on the calendar data client (230), and have been updated. For example, this may be determined by comparing the version numbers for calendar item identifiers in the synchronization state data structure (238) with version numbers for corresponding item identifiers in the data (213) for the calendar in the server calendar data store (212). However, different notifications can be sent, depending on the time of the calendar item. If the time of a calendar item is inside (or at least partially inside) the current synchronization window, then the record for the updated single-instance calendar item can be sent to the calendar data client (230) in the synchronization data (252), such as in a collection of records for updated calendar items. If the time of the updated calendar item is outside the current synchronization window, then a delete notification can be sent for the updated calendar item.

If a synchronization operation for the same calendar and the same calendar data client (230) has previously occurred and the synchronization window can move forward, the current synchronization window may include a portion that is a new incremental window in addition to a portion that was already included in the old synchronization window. If so, then records for the calendar items with times in the new incremental window can be included in the synchronization data (252), such as in a collection of updated items.

Figure 3:
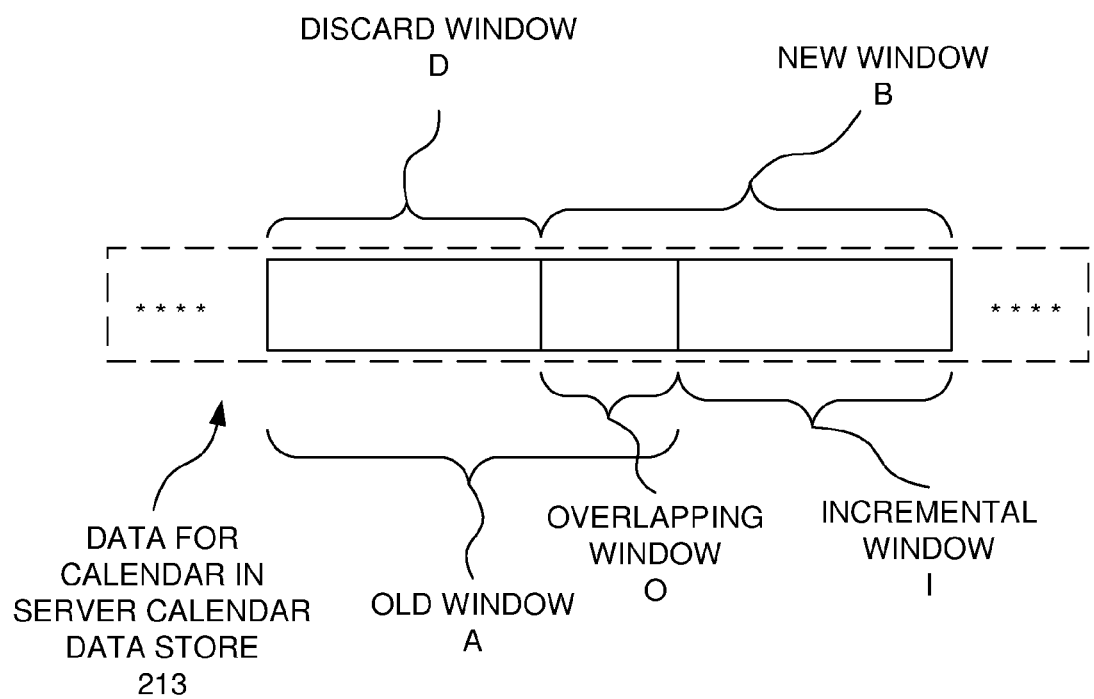
FIG. 3 is a schematic diagram of synchronization windows in a floating window scenario.

The description above discusses the treatment of calendar items that are to be deleted, whether they are recurring meetings or single instance meetings. The treatment of recurring meetings in other scenarios will now be discussed. A table below will illustrate an example of how recurring calendar items are to be synchronized in different scenarios. In this description, reference can be made to FIG. 3, which schematically illustrates the synchronization windows discussed below in the data (213) for the calendar in the server calendar data store (212). For this table, an old synchronization window can be termed window A, and the window has been slid forward by the size of the new incremental window termed window I, with the resulting current synchronization window being termed window B (with the current window B including the new incremental window I and possibly also an overlapping portion of the old window A, the portion being termed overlapping window O). The portion of the old window that is not included in the new window is the "discard window", being termed window D. An initial download of the calendar may be performed similarly to this scenario, except there is no old synchronization window A.

The following definitions are used in the table:

HD: The calendar item has instances in the discard window D;

HO: The calendar item has instances in the overlapping window O;

HI: The calendar item has instances in the new incremental window I;

HC: The calendar item has been changed since the last synchronization operation;

SM: The master record (256) for the recurring calendar item;

SD: Instance record(s) (258) in the discard window D;

SO: Instance record(s) (258) in the overlapping window O;

SI: Instance record(s) (258) in the new incremental window I;

T: True;

T*: The item is included in the response, as a delete notification;

F: False;

X: Not applicable, which means there will be no representation in the synchronization response(s) (250).

"Refreshing the series" refers to the deletion of all the existing instance records (258) for the given recurring meeting, and saving the newly received master record.

"Deleting the series" refers to the deletion of the master record (256) as well as all the existing instance records (258) for the given recurring meeting.

The table is as follows:

| Input Has Instances | | | | Output Server Sends to Client | | | | |
|---|---|---|---|---|---|---|---|---|
| HD | HO | HI | HC | SM | SD | SO | SI | Client Will Do |
| T | T | T | T | T | F | T | T | Refresh the series & Save SO & Save SI |
| T | T | T | F | F | F | F | T | Save SI |
| T | T | F | T | T | F | T | X | Refresh the series & Save SO |
| T | T | F | F | F | F | F | X | Nothing |
| T | F | T | T | T | F | X | T | Refresh the series & Save SI |
| T | F | T | F | F | F | X | T | Save SI |
| T | F | F | T | T* | F | X | X | Delete the series |
| T | F | F | F | F | F | X | X | Nothing |
| F | T | T | T | T | X | T | T | Refresh the series & Save SO & Save SI |
| F | T | T | F | F | X | F | T | Save SI |
| F | T | F | T | T | X | T | X | Refresh the series & Save SO |
| F | T | F | F | F | X | F | X | Nothing |
| F | F | T | T | T | X | X | T | Refresh the series & Save SI |
| F | F | T | F | T | X | X | T | Refresh the series & Save SI |
| F | F | F | T | T* | X | X | X | Delete the series |
| F | F | F | F | F | X | X | X | Nothing |

The following examples of simplified rules for including records for recurring items in the synchronization response(s) (250) may be derived from the table above:

1. SM=HC ∨ (¬HD ∧ ¬HO ∧ HI)

The master record (256) for a recurring calendar item is to be included in the response if the master record (256) is changed, or there are instances in the new incremental window I, but not in the old window A. Accordingly, the master record (256) is to be sent if the calendar data client (230) has not yet received the current master record for a recurring calendar item with one or more instances in the current window B. Otherwise, the master record (256) can be omitted. A delete notification for the master record (256) can be included if the recurring calendar item had instances in the old window A, but not in the current window B (specified with T* in the above table.)

2. SD=False

The instance record(s) (258) for the instances that are in the discard window D (or otherwise are not in the new window B) are not to be included. The client can have a cleanup mechanism, which can identify these potential records that have been previously saved to the client calendar data store (232) and remove them.

3. SO=HO ∧ HC

The instance record(s) (258) for the instances in the overlapping window O are to be included if the calendar item has instances in the overlapping window A, and the calendar item has changed.

4. SI=HI

The instance record(s) (258) for the instances in the new incremental window I, are to be included.

The calendar data client (230) can process the master record (256), followed by corresponding instance record(s) (258). To facilitate this order of processing, the master record (256) and instance record(s) (258) can be sent in separate collections in the response(s) (250). Also, the master record (256) and instance record(s) (258) for a recurring calendar item can be included in a single response, even if doing so would exceed a soft size limit for responses. Alternatively, the master record (256) and instance record(s) (258) to be synchronized for a recurring calendar item can be spread over multiple responses if including them all in one response would exceed a specified response size limit.

If a recurring calendar item has no occurrences inside the current synchronization window B, then instead of saving the master record (256) in the client calendar data store (232), the record may be deleted from the client calendar data store (232). Accordingly, the synchronization data (252) in the response(s) can include a collection that includes master records (256) for calendar items with occurrences in the current window B, and another collection that includes delete notifications for master records (256) for calendar items without occurrences in the current window B.

The synchronization rules (214) can also address a situation where a single instance calendar item has been converted to a recurring calendar item with occurrences in the current window B. The calendar data server (210) can detect the change to the calendar item. In response, the calendar data server (210) can include in the synchronization data (252) the corresponding master record (256) and all the corresponding instance record(s) (258) with times in the current synchronization window B.

The synchronization rules (214 and 234) can also address a situation where a recurring calendar item has been converted to a single instance calendar item in the current window B. The calendar data server (210) can detect the change to the calendar item. In response, the calendar data server (210) can send the single instance calendar item record to the calendar data client (230). The calendar data client (230) can check all the updated single instance calendar item records it receives in the synchronization data (252) to determine whether the single instance calendar item record has the same identifier as a recurring calendar item master record (256) in the data (233) for the calendar in the client calendar data store (232). If so, then the calendar data client (230) can delete the existing recurring calendar item master record (256) and all the corresponding instance record(s) (258) from the client calendar data store (232), and can store the received single instance calendar item record in the client calendar data store (232).

Rules such as the synchronization rules (214 and 234) discussed above may increase efficiency by avoiding the sending and processing of unnecessary data, while providing sufficient data to the calendar data client (230) to allow the calendar data client (230) to display calendar views within the synchronization window, and to edit the data (233) for the calendar. Such displaying and editing may be done even while the calendar data client (230) is off-line (i.e., not connected to the calendar data server (210)). Additionally, edits made to the data (233) for the calendar in the client calendar data store (232) may be communicated to the calendar data server (210) during synchronization operations. Moreover, changes to the data (213) for the calendar in the server calendar data store (212) that have occurred since the last synchronization operation can also be communicated to the client during a subsequent synchronization operation. Note that the claims below should not be limited to these benefits. Rather, as noted above, different implementations of the claimed features may produce all, some, or none of these benefits.

V. Recurring Calendar Item Master and Instance Synchronization Techniques

Several techniques for recurring calendar item master and instance synchronization will now be discussed. Each of these techniques can be performed in a computing environment, such as the computing environments discussed above. For example, each technique may be performed in a computer system that includes at least one processor and memory including instructions stored thereon that when executed by at least one processor cause at least one processor to perform the technique (memory stores instructions (e.g., object code), and when processor(s) execute(s) those instructions, processor(s) perform(s) the technique). Similarly, one or more computer-readable storage media may have computer-executable instructions embodied thereon that, when executed by at least one processor, cause at least one processor to perform the technique. The techniques discussed below may be performed at least in part by hardware logic.

Figure 4:
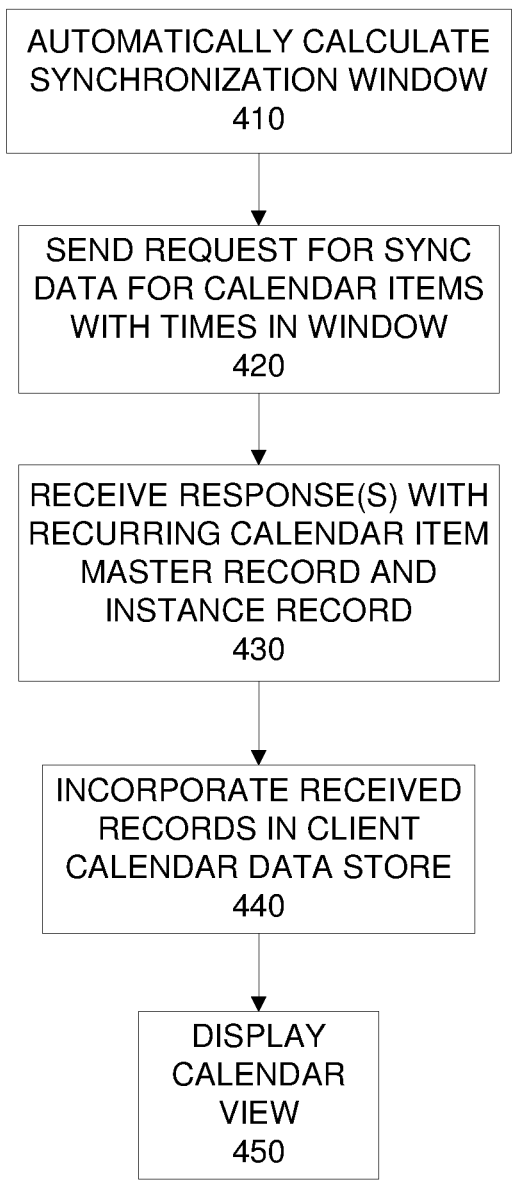
FIG. 4 is a flowchart of a technique for recurring calendar item master and instance synchronization.

Referring to FIG. 4, a technique for recurring calendar item master and instance synchronization will be discussed. The technique can include automatically calculating (410) a synchronization window for synchronizing data for a calendar in a pre-existing client calendar data store on a calendar data client computer system with data for the calendar in a server calendar data store on a calendar data server computer system. The technique can also include sending (420) to the calendar data server a request for synchronization data for calendar items for the calendar, where the calendar items have calendar times that are at least partially within the synchronization window. One or more responses to the request can be received (430) from the calendar data server. The one or more responses can include received records for calendar items that are at least partially within the synchronization window. The received records can include a master record of a recurring calendar item and an instance record of an occurrence of the recurring calendar item. The received records for the calendar items can be incorporated (440) in the client calendar data store. Additionally, a calendar view with one or more representations of the calendar items can be displayed (450) on an output device of the client computer system.

Calculating (410) the synchronization window can include calculating a main period of time using the current time, and adding a supplemental period of time for providing complete calendar views for periods of time that include the main period of time. For example, the synchronization window can be calculated as one year from the current time, plus a period of time to the end of the month that includes the one-year data, plus a period of one week. Calculating (410) the synchronization window may be performed using user input, which may be used in calculating a main period of time and/or a supplemental period of time. For example, the user input may be direct (e.g., a user selecting a two-year synchronization window, which may be calculated from the current time) or indirect (e.g., a user often browses two years ahead of time in the calendar, so that browsing user input is analyzed to determine that a two-year synchronization window is to be used).

Also, the response(s) can omit one or more records in the synchronization window that were previously received by the client computer system. Incorporating (440) the received records for the calendar items in the client calendar data store can include including the received records in the client calendar data store and keeping one or more records that were previously received by the client computer system.

The synchronization window may be termed a first synchronization window, the current time may be termed a first current time, and the request may be termed a first request. The received records may be termed old received records for old calendar items, and the calendar view may be termed a first calendar view. The technique may further include automatically calculating a second synchronization window for synchronizing the client calendar data store on the client computer system with the server calendar data store on the calendar data server. The calculation of the second synchronization window can use a second current time that is later than the first current time. A second request for synchronization data for calendar items with calendar items that are at least partially within the second synchronization window can be sent to the calendar data server. One or more responses to the second request can be received from the calendar data server. The one or more responses to the second request can include new received records for new calendar items that are at least partially within the second synchronization window. The new received records for the new calendar items can be incorporated in the client calendar data store. A second calendar view including one or more representations of one or more of the new calendar items can be displayed on the output device of the client computer system.

The second calendar view may further include one or more representations of one or more of the old calendar items. The instance record may be termed a first instance record and the new received records can include one or more additional instance records of the recurring calendar item. The one or more additional instance records can each have calendar time in the second synchronization window but not in the first synchronization window. The new received records may not include the master record. Also, the one or more responses to the second request can include one or more instructions to delete one or more records from the client calendar data store.

Still discussing the technique of FIG. 4, the calendar view can be termed an initial calendar view, and the technique can further include receiving user input requesting an additional calendar view that is outside the synchronization window. In response to receiving the user input, records for calendar items in the additional calendar view outside the synchronization window can be retrieved from the calendar data server. The additional calendar view outside the synchronization window can be displayed.

Displaying (450) the calendar view can be performed while the client computer system is not connected to the calendar data server. Also, displaying (450) the calendar view can be performed in response to receiving user input while the client computer system is not connected to the calendar data server. Displaying (450) the calendar view may also be performed in response to the user's calendar items such as preempting an upcoming meeting.

The technique of FIG. 4 may further include imposing a size limit on each of the one or more responses. For example, the size limit may be communicated to the calendar data server from the calendar data client. The size limit may be a hard limit that is not to be exceeded. Alternatively, the size limit may be a soft limit that the calendar data server can override by sending the master record and all instance records for the recurring calendar item in the synchronization operation in a single response if the master record and all the instance records for the recurring calendar item in the synchronization operation exceed the limit.

Figure 5:
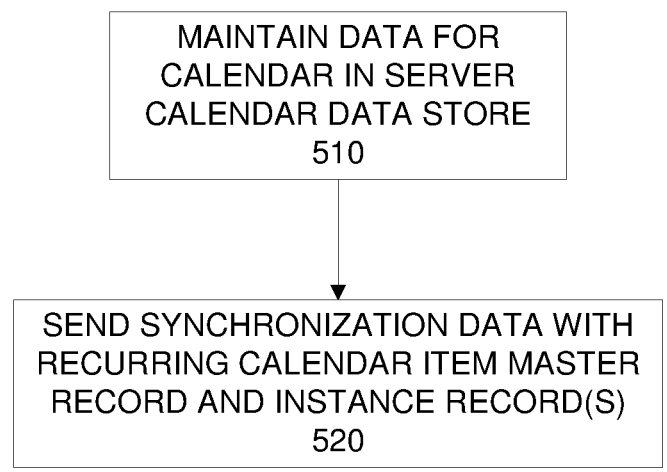
FIG. 5 is a flowchart of another technique for recurring calendar item master and instance synchronization.

Referring to FIG. 5, another technique for recurring calendar item master and instance synchronization will be discussed. The technique can include a calendar data server computer system maintaining (510) data for a calendar in a server calendar data store. The calendar data server can send (520) synchronization data for the calendar from the calendar data store to a calendar data client computer system in a synchronization operation. The synchronization data can include a master record of a recurring calendar item and at least one instance record of an occurrence of the recurring calendar item.

The synchronization operation can be performed automatically in response to a request from the client computer system or in response to a change in the server's calendar. The technique can further include identifying the synchronization data, which can include identifying a synchronization time window and identifying calendar items having times within the synchronization time window. Identifying the synchronization data may include identifying data records for calendar items from the calendar that have times outside the synchronization window. The technique can further include excluding such data records from the synchronization data. Identifying the synchronization data may include identifying data records for calendar items from the calendar that have times within the synchronization window and were previously sent to the client computer system. The technique can include excluding such data records from the synchronization data.

Figure 6:
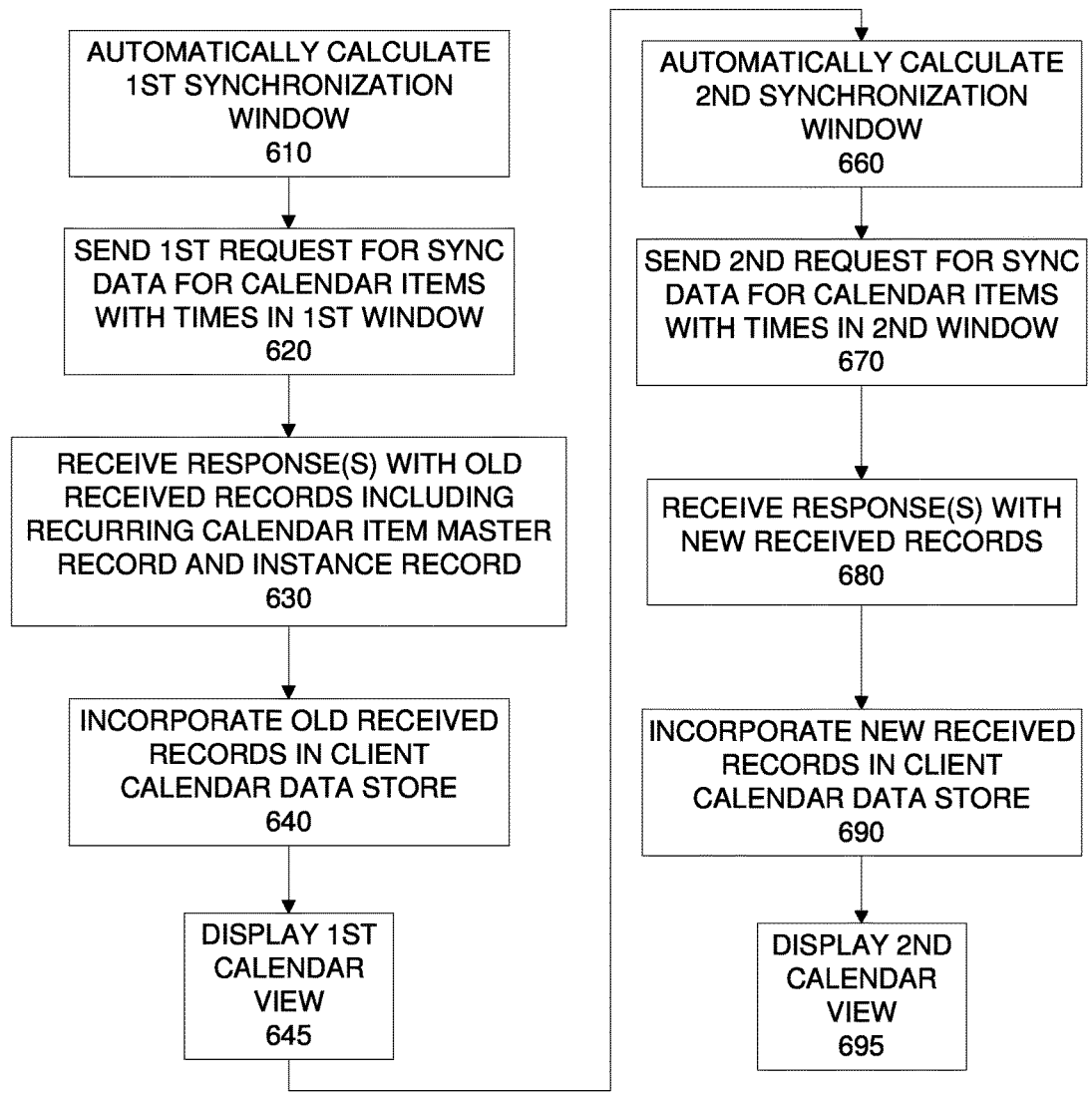
FIG. 6 is a flowchart of yet another technique for recurring calendar item master and instance synchronization.

Referring to FIG. 6, yet another technique for recurring calendar item master and instance synchronization will be discussed. The technique can include automatically calculating (610) a first synchronization window for synchronizing a pre-existing client calendar data store on a client computer system with a server calendar data store on a calendar data server. The calculation (610) of the first synchronization window can include calculating a main period of time from a first current time, plus a supplemental period of time for providing complete calendar views of periods of time that include the main period of time. The technique can also include sending (620) to the calendar data server a first request for synchronization data for old calendar items with calendar times that are at least partially within the first synchronization window. The technique may also include receiving (630) from the calendar data server one or more responses to the first request. The one or more responses can include received old received records for calendar items that are at least partially within the first synchronization window. The old received records can include a master record of a recurring calendar item and an instance record of an occurrence of the recurring calendar item. The one or more response can omit one or more records in the first synchronization window that were previously received by the client computer system. The received old records for the calendar items can be incorporated (640) in the client calendar data store. Incorporating (640) the old received records can include including the old received records in the client calendar data store, as well as keeping the one or more records that were previously received by the client computer system. A first calendar view with one or more representations of the calendar items can be displayed (645) on an output device of the client computer system. The first calendar view can display less than the entire first synchronization window.

The technique of FIG. 6 can further include automatically calculating (660) a second synchronization window for synchronizing the client calendar data store on the client computer system with the server calendar data store on the calendar data server. The calculation (660) of the second synchronization window can use a second current time that is later than the first current time and may not take into account user input. The technique of FIG. 6 can further include sending (670) to the calendar data server a second request for synchronization data for calendar items with calendar times that are at least partially within the second synchronization window. One or more responses to the second request can be received (680). The one or more responses to the second request can include new received records for new calendar items that are at least partially within the second synchronization window. The instance record can be termed a first instance record, and the new received records can include one or more additional instance records of the recurring calendar item. The one or more additional instance records can have calendar times in the second synchronization window but not in the first synchronization window. The new received records may not include the master record. The new received records may incorporate (690) the new received records for the new calendar items in the client calendar data store. A second calendar view can be displayed (695). The second calendar view can include one or more representations of one or more of the new calendar items on the output device of the client computer system. The second calendar view can further include one or more representations of one or more of the old calendar items.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A calendaring computer system comprising:
   at least one processor; and
   memory comprising instructions stored thereon that when executed by at least one processor cause at least one processor to perform acts comprising:
      calculating a synchronization window for synchronizing data for a calendar in a pre-existing client calendar data store on a calendar data client computer system with data for the calendar in a server calendar data store on a calendar data server computer system, the calculation of the synchronization window using a current time;
      receiving, from the calendar data server computer system, records for calendar items that are at least partially within the synchronization window, the received records comprising a master record of a recurring calendar item and an instance record of an occurrence of the recurring calendar item;
      incorporating the received records for the calendar items in the client calendar data store;
      displaying an initial calendar view with one or more representations of the calendar items on an output device of the client computer system; and
      receiving user input requesting an additional calendar view that is outside the synchronization window, and in response to the receiving of the user input requesting the additional calendar view, performing the following:
         retrieving, from the calendar data server computer system, records for calendar items in the additional calendar view that is outside the synchronization window; and
         displaying the additional calendar view that is outside the synchronization window.

2. The calendaring computer system of claim 1, wherein calculating the synchronization window comprises calculating a main period of time using the current time, and adding a supplemental period of time for providing complete calendar views of periods of time that include the main period of time.

3. The calendaring computer system of claim 1, wherein calculating the synchronization window is performed using user input.

4. The calendaring computer system of claim 1, wherein the records for calendar items that are at least partially within the synchronization window one or more records in the synchronization window that were previously received by the client computer system.

5. The calendaring computer system of claim 4, wherein incorporating the received records for the calendar items in the client calendar data store comprises including the received records in the client calendar data store and keeping the one or more records that were previously received by the client computer system.

6. The calendaring computer system of claim 1, wherein the synchronization window is a first synchronization window, the current time is a first current time, the received records are old received records for old calendar items, the initial calendar view is a first calendar view, and wherein the acts further comprise:
calculating a second synchronization window for synchronizing the client calendar data store on the client computer system with the server calendar data store on the calendar data server computer system, the calculation of the second synchronization window using a second current time that is later than the first current time;
receiving, from the calendar data server computer system, new received records for new calendar items that are at least partially within the second synchronization window;
incorporating the new received records for the new calendar items in the client calendar data store; and
displaying a second calendar view including one or more representations of one or more of the new calendar items on the output device of the client computer system, wherein the second calendar view further includes one or more representations of one or more of the old calendar items.

7. The calendaring computer system of claim 1, wherein the synchronization window is a first synchronization window, the current time is a first current time, the received records are old received records for old calendar items, the initial calendar view is a first calendar view, and wherein the acts further comprise:
calculating a second synchronization window for synchronizing the client calendar data store on the client computer system with the server calendar data store on the calendar data server computer system, the calculation of the second synchronization window using a second current time that is later than the first current time;
receiving, from the calendar data server computer system, new received records for new calendar items that are at least partially within the second synchronization window;
incorporating the new received records for the new calendar items in the client calendar data store; and
displaying a second calendar view including one or more representations of one or more of the new calendar items on the output device of the client computer system; and
wherein the instance record is a first instance record and the new received records comprise one or more additional instance records of the recurring calendar item, with the one or more additional instance records each having a calendar time in the second synchronization window but not in the first synchronization window.

8. The calendaring computer system of claim 7, wherein the new received records do not include the master record.

9. The calendaring computer system of claim 7, wherein the acts further comprise receiving one or more instructions to delete one or more records from the client calendar data store in response to a request for synchronization data for calendar items with calendar times that are at least partially within the second synchronization window.

10. The calendaring computer system of claim 1, wherein displaying the initial calendar view is performed while the client computer system is not connected to the calendar data server computer system, and wherein displaying the initial calendar view is performed in response to receiving user input while the client computer system is not connected to the calendar data server computer system.

11. The calendaring computer system of claim 1, wherein the acts further comprise imposing a size limit on each of one or more responses that include the records for calendar items that are at least partially within the synchronization window, wherein the size limit is a soft limit that the calendar data server computer system can override by sending the master record and all instance records for the recurring calendar item in a synchronization operation in a single response if the master record and all the instance records for the recurring calendar item in the synchronization operation exceed the limit.

12. The calendaring computer system of claim 1, further comprising, in response to receiving user input while the client computer system is not connected to the calendar data server computer system, displaying a calendar view with one or more representations of the calendar items on an output device of the client computer system, the displaying of the calendar view being performed while the client computer system is not connected to the calendar data server computer system.

13. A computer-implemented method comprising:
calculating, via a calendaring computer system, a synchronization window for synchronizing data for a calendar in a pre-existing client calendar data store on a calendar data client computer system with data for the calendar in a server calendar data store on a calendar data server computer system, the calculation of the synchronization window using a current time;
receiving, from the calendar data server computer system, records for calendar items that are at least partially within the synchronization window, the received records comprising a master record of a recurring calendar item and an instance record of an occurrence of the recurring calendar item;
incorporating the received records for the calendar items in the client calendar data store;
displaying an initial calendar view with one or more representations of the calendar items on an output device of the client computer system; and
receiving user input requesting an additional calendar view that is outside the synchronization window, and in response to the receiving of the user input requesting the additional calendar view, performing the following:
  retrieving, from the calendar data server computer system, records for calendar items in the additional calendar view that is outside the synchronization window; and
  displaying the additional calendar view that is outside the synchronization window.

14. The method of claim 13, wherein the calculating of the synchronization window comprises calculating a main period of time using the current time, and adding a supplemental period of time for providing complete calendar views of periods of time that include the main period of time.

15. A calendaring computer system comprising:
  at least one processor; and
  memory comprising instructions stored thereon that when executed by at least one processor cause at least one processor to perform acts comprising:
    calculating a synchronization window for synchronizing data for a calendar in a pre-existing client calendar data store on a calendar data client computer system with data for the calendar in a server calendar data store on a calendar data server computer system, the calculating of the synchronization window using a current time, and the calculating of the synchronization window comprising:
      calculating a main period of time using the current time; and
      adding a supplemental period of time for providing complete calendar views of periods of time that include the main period of time;
    receiving, from the calendar data server computer system, records for calendar items that are at least partially within the synchronization window, the received records comprising a master record of a recurring calendar item and an instance record of an occurrence of the recurring calendar item;
    incorporating the received records for the calendar items in the client calendar data store; and
    displaying a calendar view with one or more representations of the calendar items on an output device of the client computer system.

16. The calendaring computer system of claim 15, wherein calculating the synchronization window is performed using user input.

17. The calendaring computer system of claim 15, wherein the received records for calendar items that are at least partially within the synchronization window omit one or more records in the synchronization window that were previously received by the client computer system.

18. The calendaring computer system of claim 17, wherein incorporating the received records for the calendar items in the client calendar data store comprises including the received records in the client calendar data store and keeping the one or more records that were previously received by the client computer system.

19. The calendaring computer system of claim 15, wherein displaying the calendar view is performed while the client computer system is not connected to the calendar data server computer system, and wherein displaying the calendar view is performed in response to receiving user input while the client computer system is not connected to the calendar data server computer system.

20. The calendaring computer system of claim 15, further comprising imposing a size limit on each of the one or more responses that include the received records for calendar items that are at least partially within the synchronization window, wherein the size limit is a soft limit that the calendar data server computer system can override by sending the master record and all instance records for the recurring calendar item in a synchronization operation in a single response if the master record and all the instance records for the recurring calendar item in the synchronization operation exceed the limit.

* * * * *